United States Patent
Gieras et al.

(10) Patent No.: US 11,081,930 B2
(45) Date of Patent: Aug. 3, 2021

(54) KINETIC ENERGY STORAGE WITH A SWITCHED RELUCTANCE MACHINE

(71) Applicant: Hamilton Sundstrand Corporation, Charlotte, NC (US)

(72) Inventors: Jacek F. Gieras, Glastonbury, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 126 days.

(21) Appl. No.: 15/825,727

(22) Filed: Nov. 29, 2017

(65) Prior Publication Data
US 2019/0165645 A1  May 30, 2019

(51) Int. Cl.
| | |
|---|---|
| H02K 7/02 | (2006.01) |
| F03G 3/08 | (2006.01) |
| H02K 1/14 | (2006.01) |
| H02K 19/10 | (2006.01) |
| H02K 15/02 | (2006.01) |
| H02K 15/06 | (2006.01) |
| H02K 1/24 | (2006.01) |
| H02K 1/27 | (2006.01) |
| H02K 7/09 | (2006.01) |

(52) U.S. Cl.
CPC .............. *H02K 7/025* (2013.01); *F03G 3/08* (2013.01); *H02K 1/14* (2013.01); *H02K 1/146* (2013.01); *H02K 1/246* (2013.01); *H02K 1/2793* (2013.01); *H02K 15/022* (2013.01); *H02K 15/062* (2013.01); *H02K 19/103* (2013.01); *H02K 7/09* (2013.01)

(58) Field of Classification Search
CPC . F03G 3/08; H02K 7/025; H02K 7/02; H02K 1/14; H02K 1/246; H02K 1/2793; H02K 16/00; H02K 16/04; H02K 19/103; H02K 1/2786; H02K 1/28; H02K 1/30; H02K 1/24
USPC .............................. 310/74, 156.32, 112, 268
See application file for complete search history.

(56) References Cited

U.S. PATENT DOCUMENTS

| | | |
|---|---|---|
| 5,545,938 A | 8/1996 | Mecrow |
| 5,862,686 A | 1/1999 | Skrippek |
| 5,931,249 A | 8/1999 | Ellis et al. |
| 6,177,746 B1 | 1/2001 | Tupper et al. |
| 6,445,105 B1* | 9/2002 | Kliman ................. H02K 1/14 310/156.35 |
| 6,768,237 B1 | 7/2004 | Schroedl |
| 6,794,776 B1* | 9/2004 | Gabrys ................. H02K 7/025 310/209 |
| 6,794,791 B2 | 9/2004 | Ben Ahmed et al. |
| (Continued) | | |

OTHER PUBLICATIONS

Bernard, Nicolas, et al; "Axial Field Synchronous Machine with Homopolar Flux in the airgap for a Flywheel Accumulator"; IEEE IAS Meeting and Conference; pp. 1258-1265; 2002.

*Primary Examiner* — Michael Andrews
(74) *Attorney, Agent, or Firm* — Cantor Colburn LLP

(57) ABSTRACT

A kinetic energy storage system is provided. The kinetic energy storage system comprising: a vacuum container enclosing a vacuum chamber; and a flywheel located within the vacuum chamber, the flywheel being configured to convert electrical energy into kinetic energy, wherein the flywheel comprises: a rotor assembly and a stator assembly located within the rotor assembly.

13 Claims, 6 Drawing Sheets

(56) References Cited

U.S. PATENT DOCUMENTS

| | | | |
|---|---|---|---|
| 2005/0110364 A1* | 5/2005 | Yanagisawa | H02K 21/227 310/261.1 |
| 2008/0001496 A1* | 1/2008 | Lau | H02K 23/30 310/269 |
| 2013/0069495 A1 | 3/2013 | Jun | |
| 2014/0265674 A1* | 9/2014 | Kalev | H02K 5/04 310/71 |
| 2015/0222151 A1* | 8/2015 | Semken | H02K 1/278 310/216.008 |
| 2017/0126087 A1* | 5/2017 | Soderberg | H02K 1/17 |

* cited by examiner

KINETIC ENERGY STORAGE WITH A SWITCHED RELUCTANCE MACHINE

BACKGROUND

The subject matter disclosed herein generally energy storage systems, and more specifically to an apparatus and a method for energy storage in kinetic energy storage systems.

Flight control surface actuation is commonly accomplished by separate drive systems and control systems, which leads to added weight and complexity.

A flywheel energy storage (FES) system draws electrical energy from a primary source, such as the utility grid or vehicle-mounted generator, and stores it in a high-density rotating flywheel. The flywheel system is a kinetic, or mechanical battery, spinning at very high speeds. Upon power loss, the motor driving the flywheel acts as a generator. As the flywheel continues to rotate, this generator supplies power to the customer load.

BRIEF SUMMARY

According to one embodiment, a kinetic energy storage system is provided. The kinetic energy storage system comprising: a vacuum container enclosing a vacuum chamber; and a flywheel located within the vacuum chamber, the flywheel being configured to convert electrical energy into kinetic energy, wherein the flywheel comprises: a rotor assembly and a stator assembly located within the rotor assembly.

In addition to one or more of the features described above, or as an alternative, further embodiments may include that the rotor assembly is configured to rotate relative to the vacuum chamber.

In addition to one or more of the features described above, or as an alternative, further embodiments may include that the stator assembly is configured to remain stationary relative to the vacuum container.

In addition to one or more of the features described above, or as an alternative, further embodiments may include that the stator assembly further comprises: a stator core; and one or more stator pole cores, each of the one or more stator pole cores being located proximate a distal end of the stator core.

In addition to one or more of the features described above, or as an alternative, further embodiments may include that the stator core is disc-shaped and the one or more stator pole cores are about equally spaced around the distal end of the stator core.

In addition to one or more of the features described above, or as an alternative, further embodiments may include that each of the one or more stator pole cores further comprises: an upper stator pole operably connected to an upper side of the stator core; and a lower stator pole operably connected to a lower side of the stator core.

In addition to one or more of the features described above, or as an alternative, further embodiments may include that wherein the upper stator pole further comprises: an upper stator pole face, wherein an upper inset area is interposed between the upper stator pole face and the upper side of the stator core, the upper inset area having a diameter less than a diameter of the upper stator pole face.

In addition to one or more of the features described above, or as an alternative, further embodiments may include that the upper stator pole further comprises: an upper stator coil wrapped around the upper inset area, wherein electrical power is provided to the upper stator coil through an electrical lead line.

In addition to one or more of the features described above, or as an alternative, further embodiments may include that the lower stator pole further comprises: a lower stator pole face, wherein a lower inset area is interposed between the lower stator pole face and the lower side of the stator core, the lower inset area having a diameter less than a diameter of the lower stator pole face.

In addition to one or more of the features described above, or as an alternative, further embodiments may include that the lower stator pole further comprises: a lower stator coil wrapped around the lower inset area, wherein electrical power is provided to the lower stator coil through an electrical lead line.

In addition to one or more of the features described above, or as an alternative, further embodiments may include that the rotor assembly further comprises: the rotor assembly is cylindrically shaped and includes one or more rotor pole cores, each of the one or more stator pole cores being located on a cylindrical surface proximate a distal end of the rotor assembly.

In addition to one or more of the features described above, or as an alternative, further embodiments may include that the one or more rotor pole cores are about equally spaced around the cylindrical of the rotor assembly.

In addition to one or more of the features described above, or as an alternative, further embodiments may include that the rotor assembly further comprises: an upper rotor cup comprising: an upper central body: one or more upper rotor arms projecting radially outward from the upper central body; and one or more upper rotor poles, wherein each of the one or more upper rotor poles is located at a distal end of the one or more upper rotor arms; and a lower rotor cup comprising: a lower central body: one or more lower rotor arms projecting radially outward from the lower central body; and one or more lower rotor poles, wherein each of the one or more lower rotor poles is located at a distal end of the one or more lower rotor arms.

In addition to one or more of the features described above, or as an alternative, further embodiments may include that the vacuum container is cylindrical in shape.

In addition to one or more of the features described above, or as an alternative, further embodiments may include that the vacuum container further comprises: a first face; a second face opposite the first face, wherein a central axis extends from the first face to the second face; and a stationary bushing located along the central axis, the stationary bushing extending from the first face to the second face, wherein the rotor assembly is operably connected to the stationary bushing and the rotor assembly is configured to rotate around the stationary bushing.

According to another embodiment, a method of assembling a kinetic energy storage system is provided. The method comprising: operably connecting a stator assembly to a vacuum container such that the stator assembly is configured to not rotate relative to the vacuum container, wherein the vacuum container encloses a vacuum chamber and the stator assembly is located within the vacuum chamber; operably connecting a rotor assembly to the vacuum container such that the rotor assembly is configured to rotate relative to the vacuum container, wherein the rotor assembly is configured to rotate relative to the vacuum container; and enclosing the stator assembly in the rotor assembly.

In addition to one or more of the features described above, or as an alternative, further embodiments may include that prior to the operably connecting a stator assembly, the method further comprises: operably attaching one or more stator pole cores to a stator core of the stator assembly, each of the one or more stator pole cores being located proximate a distal end of the stator core.

In addition to one or more of the features described above, or as an alternative, further embodiments may include that prior to the operably connecting a stator assembly, the method further comprises: operably attaching one or more upper stator pole cores to an upper side of a stator core of the stator assembly, each of the one or more upper stator pole cores being located proximate a distal end of the stator core; and operably attaching one or more lower stator pole cores to a lower side of the stator core of the stator assembly, each of the one or more lower stator pole cores being located proximate a distal end of the stator core.

In addition to one or more of the features described above, or as an alternative, further embodiments may include wrapping an upper stator coil around an upper inset area; and wrapping a lower stator coil around a lower inset area.

In addition to one or more of the features described above, or as an alternative, further embodiments may include that the enclosing further comprises: operably connecting an upper rotor cup of the rotor assembly to a lower rotor cup of the rotor assembly, such that the stator assembly is located within the rotor assembly.

Technical effects of embodiments of the present disclosure include utilizing incorporating a switched reluctance machine (SRM) into a flywheel of kinetic energy storage system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
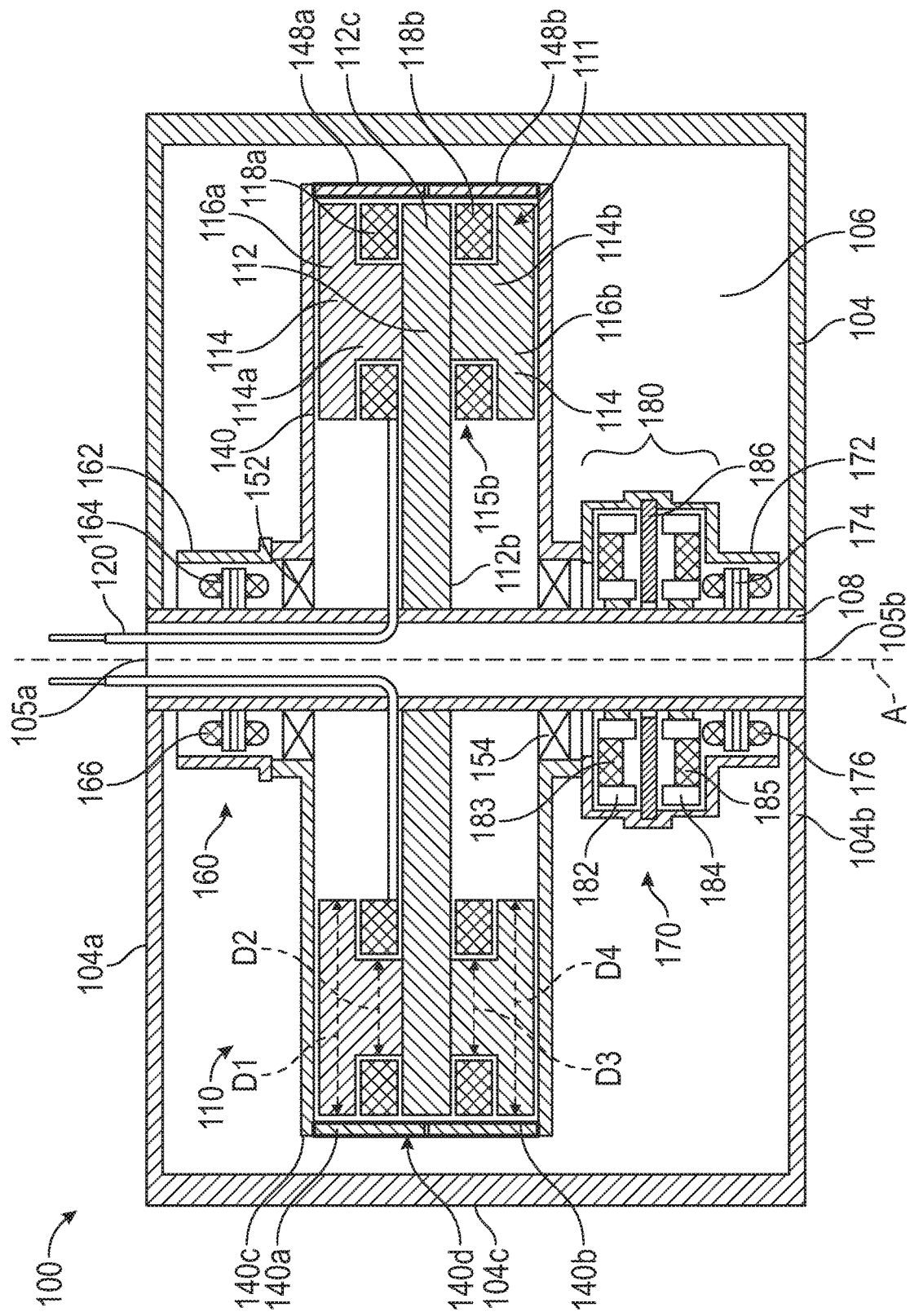
FIG. 1 is a cross-sectional view of a kinetic energy storage system according to an embodiment of the present disclosure.
Figure 2:
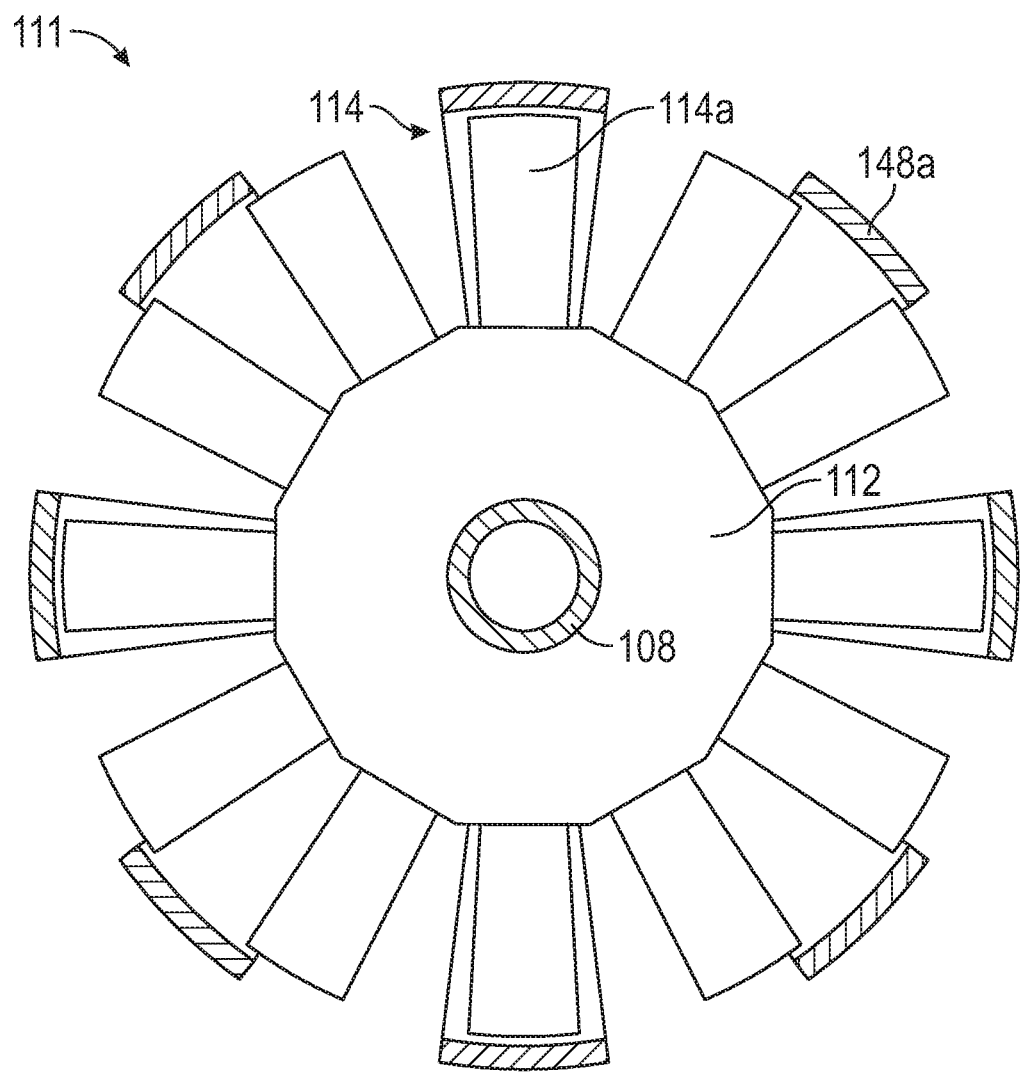
FIG. 2 is a top view of a stator assembly of the kinetic energy storage system of FIG. 1, according to an embodiment of the present disclosure.
Figure 3:
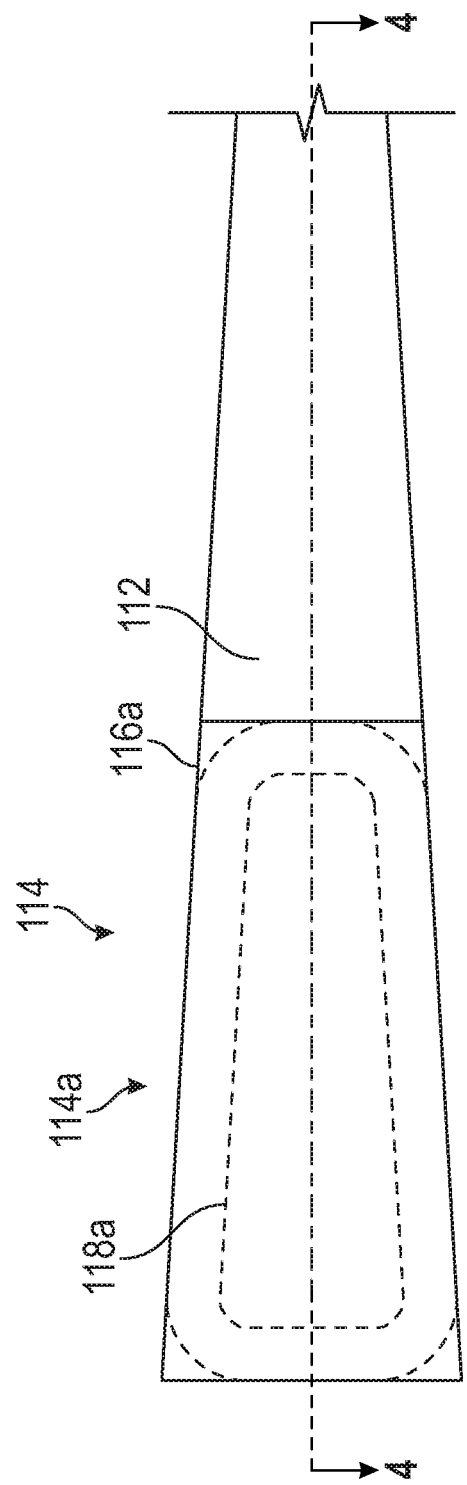
FIG. 3 is a top view of a stator pole of a stator assembly, according to an embodiment of the present disclosure.
Figure 4:
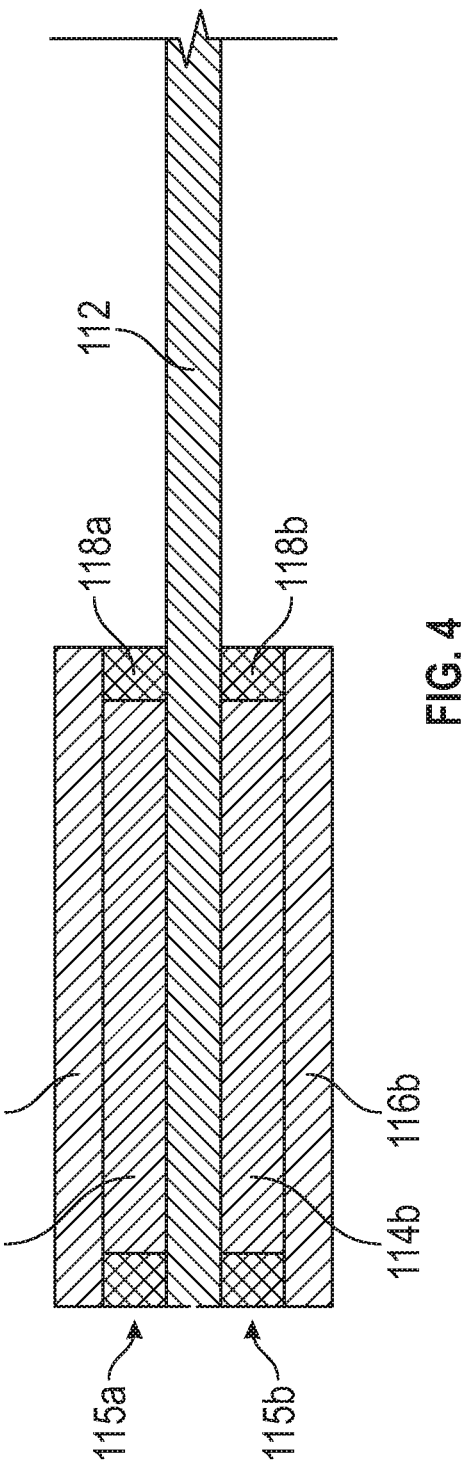
FIG. 4 is a cross-sectional view of a stator pole of a stator assembly, according to an embodiment of the present disclosure.
Figure 5:
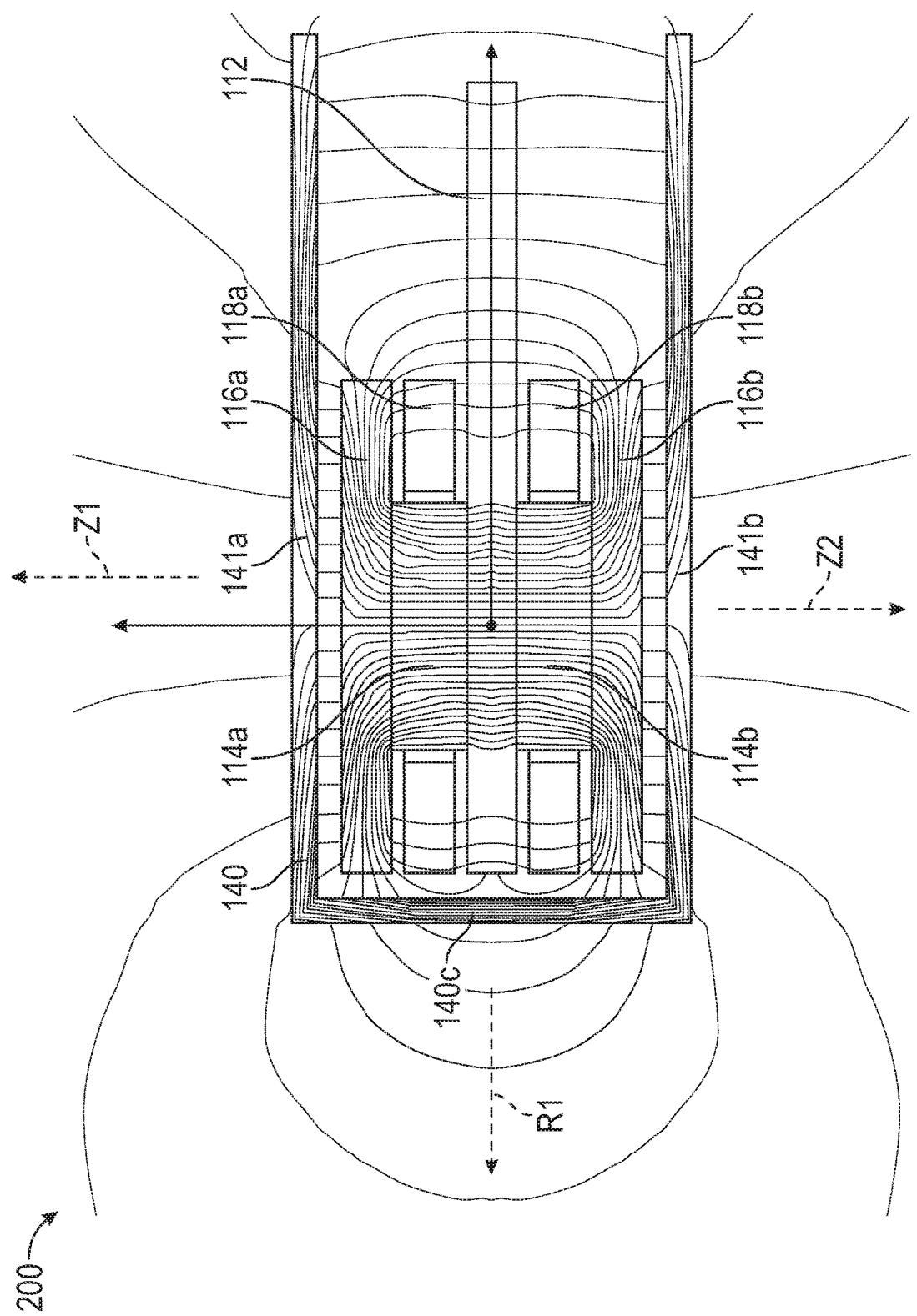
FIG. 5 is a cross-sectional view of a magnetic flux lines for a stator pole of a stator assembly, according to an embodiment of the present disclosure.

Referring now to FIGS. 1-5. FIG. 1 shows a cross-sectional view of a kinetic energy storage system 100, according to an embodiment of the present disclosure. FIG. 2 shows a top view of a stator assembly 111 of the kinetic energy storage system 100 of FIG. 1, according to an embodiment of the present disclosure. FIG. 3 shows a top view of a stator pole 114 of a stator assembly 111, according to an embodiment of the present disclosure. FIG. 4 shows a cross-sectional view of a stator pole 114 of a stator assembly 111, according to an embodiment of the present disclosure. FIG. 5 shows a cross-sectional view of a flux lines created by a rotor assembly 140, according to an embodiment of the present disclosure. The kinetic energy storage system 100 includes a fly wheel 110 configured to convert electrical energy into kinetic energy for kinetic energy storage. The flywheel 110 is composed of a rotor assembly 140 enclosing a stator assembly 111. The rotor assembly 140 and the stator assembly 111 are configured to act as a switched reluctance machine (SRM) to rotate the flywheel 110. The flywheel 110 rotates by rotating the rotor assembly 140, thus kinetic energy is stored in the rotating rotor assembly. When it is desired to discharge the kinetic energy as electric energy, the rotor assembly 140 and the stator assembly 111 acts as a generator to convert the kinetic energy of the rotating rotor assembly 140 to electric energy.

The rotor assembly 140 is configured to rotate relative to the stator assembly 111 when an electrical current is applied to the stator assembly 111. The kinetic energy storage system 100 is composed of a vacuum container 104 enclosing a vacuum chamber 106. The fly wheel 110 is located within the vacuum chamber 106. The vacuum container 104 may be cylindrical in shape as illustrated in FIG. 1. The vacuum container 104 may have a first face 104a and a second face 104b opposite the first face. The vacuum container 104 may have a first face 104a and a second face 104b opposite the first face 104a. The first face 104a and the second face 104b may each be circular in shape. An outward side 104c may be interposed between the first face 104a and the second face 104b. The outward side 104c may be radially outward from a central axis A of the vacuum container 104. The central axis A may extend from a geometric center 105a of the first 104a to a geometric center 105b of the second face 104b. For example if both the first face 104a is circular in shape, the geometric centers 105a is center of circular shaped first face 104a. The first face 104a, the second face 104b, and the outward side 104c may be operably connected to form the vacuum container 104 and enclose the vacuum chamber 106. The vacuum chamber 106 may be void of air and other gases. The kinetic energy storage system 100 may further include a stationary bushing 108 located along the central axis A of the vacuum container 104. The stationary bushing 108 extends from the first face 104a to the second face 104b, as seen in FIG. 1. The stationary bushing 108 is configured to remain stationary relative to the vacuum container 104.

The kinetic energy storage system 100 may further include a stator assembly 111 and rotor assembly 140 located within the vacuum chamber 106. The stator assembly 111 is operably connected to the stationary bushing 108. The stator assembly 111 is configured to remain stationary relative to the stationary bushing 108 and the vacuum container 104. The stator assembly 111 is located within the rotor assembly 140 and the rotor assembly 140 is configure to rotate around the stationary bushing 108. The kinetic energy storage system 100 may include an upper radial magnetic bearing 160 and a lower radial magnetic bearing 170. The upper radial magnetic bearing 160 may be composed of a rotor 162 and a stator 164 enclosed within the rotor 162. The stator 164 includes stator windings 166.

The lower radial magnetic bearing 170 may be composed of a rotor 172 and a stator 174 enclosed within the rotor 172. The stator 174 includes stator windings 176. The lower radial magnetic bearing 170 may also include an axial magnetic bearing 180. The axial magnetic bearing 180 may be enclosed within the rotor 160. The axial magnetic bearing 180 may include an upper stator 182 with stator windings 183 and a lower stator 184 with stator windings 185. A rotor disc 186 may be located interposed between the upper stator 182 and the lower stator 184 of the axial magnetic bearing 180.

The stator assembly 111 comprises a stator core 112 and one or more stator pole cores 114. The stator core 112 may be disc shaped. Each of the one or more stator pole cores 114 may be operably attached to the stator core 112 proximate a distal end 112c of the stator core 112, as seen in FIG. 1. Each of the one or more stator pole cores 114 are about equally spaced around the distal end 112c of the stator core 112, as seen in FIG. 2. The stator poles 114 are each composed of a ferromagnetic material including, but not limited to, solid steel or ferromagnetic laminations. The stator pole core 114 may be composed of an upper stator pole 114a and a lower stator pole 114b. The upper stator pole 114a may be operably connected to an upper side 112a of the stator core 112 and the lower stator pole 114b may be operably connect to a lower side 112b of the stator core 112, as seen in FIG. 1. The upper stator pole 114a may include an upper stator pole face 116a attached to the upper stator pole 114a and the lower stator pole 114b may include a lower stator pole face 116b attached to the lower stator pole 114b, as seen in FIG. 1. Alternatively, the upper stator pole 114a and the upper stator pole face 116a may be a single piece; and the lower stator pole 114b and the lower stator pole face 116b may be a single piece. An upper inset area 115a may be formed in the upper stator pole 114a and lower inset area 115b may be formed in the lower stator pole 114b. The upper inset area 115a is interposed between the upper stator pole face 116a and the upper side 112a of the stator core 112. The upper inset area 115a has a diameter D2 less than a diameter D1 of the upper stator pole face 116a. The lower inset area 115b is interposed between the lower stator pole face 116b and the lower side 112b of the stator core 112. The lower inset area 115b has a diameter D3 less than a diameter D4 of the lower stator pole face 116b.

The stator assembly 111 may further comprise an upper stator coil 118a and a lower stator coil 118b, as seen in FIG. 1. The upper stator coil 118a and the lower stator coil 118b may be composed of wound copper or aluminum wires with circular of rectangular cross section. The upper stator coil 118a may be wrapped around the upper inset area 115a, as seen in FIGS. 1, 3, and 4. The lower stator coil 118b may be wrapped around the lower inset area 115b, as seen in FIGS. 1 and 4. Electrical power may be provided to the upper stator coil 118a and the lower stator coil 118b through an electrical lead line 120. The electrical lead line 120 may be run through the stationary bushing 108 to each of the upper stator coils 118a and lower stator coils 118b, as seen in FIG. 1.

The stator assembly 111 is located within the rotor assembly 140. The rotor assembly 140 may be cylindrical in shape. The rotor assembly 140 is operably connected to the stationary bushing 108. The rotor assembly 140 is configured to rotate around the stationary bushing 108 within the vacuum chamber 106 of the vacuum container 104. The rotor assembly 140 may be operably connected to the stationary bushing 108 through an upper bearing 152 and a lower bearing 154. The upper bearing 152 and the lower bearing 154 may each be roller bearings. The upper bearing 152 and the lower bearing 154 are each configured to allow the rotor assembly 140 to rotate around the stationary bushing 108. The rotor assembly 140 may be composed of a ferromagnetic material, such as, for example, steel or any other ferromagnetic material known to one of skill in the art. The rotor assembly 140 may be composed of an upper rotor cup 140a and a lower rotor cup 140b. The upper rotor cup 140a includes one or more upper rotor poles 148a and the lower rotor cup 140b includes one or lower rotor poles 148b. Alternatively, the rotor assembly 140 may be composed of a single cylindrical body having one or more rotor poles 148a, 148b located on a cylindrical surface 140d at a distal end 140c of the rotor assembly 140. The rotor poles 148a, 148b may be about equally spaced around the cylindrical surface 140d of the rotor assembly 140.

As seen in FIG. 5, when the electrical lead lines 120 are excited with current, the upper stator pole 114a and the low stator pole 114b produce a magnetic flux lines 200 to rotate the rotor assembly 140 to rotate relative to the stator assembly 111 to rotate. The magnetic flux lines 200 generated by the upper stator pole 114a and the low stator pole 114b may be seen in FIG. 5. As seen in FIG. 5, the magnetic flux lines 200 is produced at the upper stator pole face 116a and emanates away from the upper stator pole face 116a. The magnetic flux lines 200 may emanate away from the upper stator pole face 116a in the upward direction Z1 as seen in FIG. 5. As seen in FIG. 5, the magnetic flux lines 200 is produced at the lower stator pole face 116b and emanates away from the lower stator pole face 116b. The magnetic flux lines 200 may emanate away from the lower stator pole face 116b in the downward direction Z2 as seen in FIG. 5. The magnetic flux lines 200 may emanate away from the upper stator pole 114a and the lower stator pole 114b in the radially outward direction R1, as seen in FIG. 5. Magnetic flux lines 200 propagate in direction Z1, direction Z2, and direction R1. An upper circular surface 141a of the rotor assembly 140 is in direction Z1 and opposite the upper stator pole face 116a, as seen in FIG. 5. A lower circular surface 141b of the rotor assembly is in the Z2 direction and opposite the lower stator pole face 116b, as seen in FIG. 5. The outward side 104c (i.e. cylindrical surface) of the rotor assembly 140 is in direction R1 radially outward from the stator assembly 111. Advantageously, electromagnetic torque is produced by all surfaces of the rotor assembly 140 including the upper circular surface 141a in direction Z1, the lower circular surface 141b in direction Z2, and the outward side 104c (i.e. cylindrical surface) in direction R1.

Advantageously, the compact design of the kinetic energy storage system 100 illustrated in FIG. 1, allows for lightweight kinetic energy storage in a small volume envelope. Also, advantageously, since the kinetic energy storage system 100 may also operate as a SRM without the need for permanent magnets, the kinetic energy storage system 100 may work at elevated temperatures not possible with permanent magnets. Additionally, as permanent magnets are traditionally high cost items, cost reductions may be seen by avoiding the use of permanent magnets.

Figure 6:
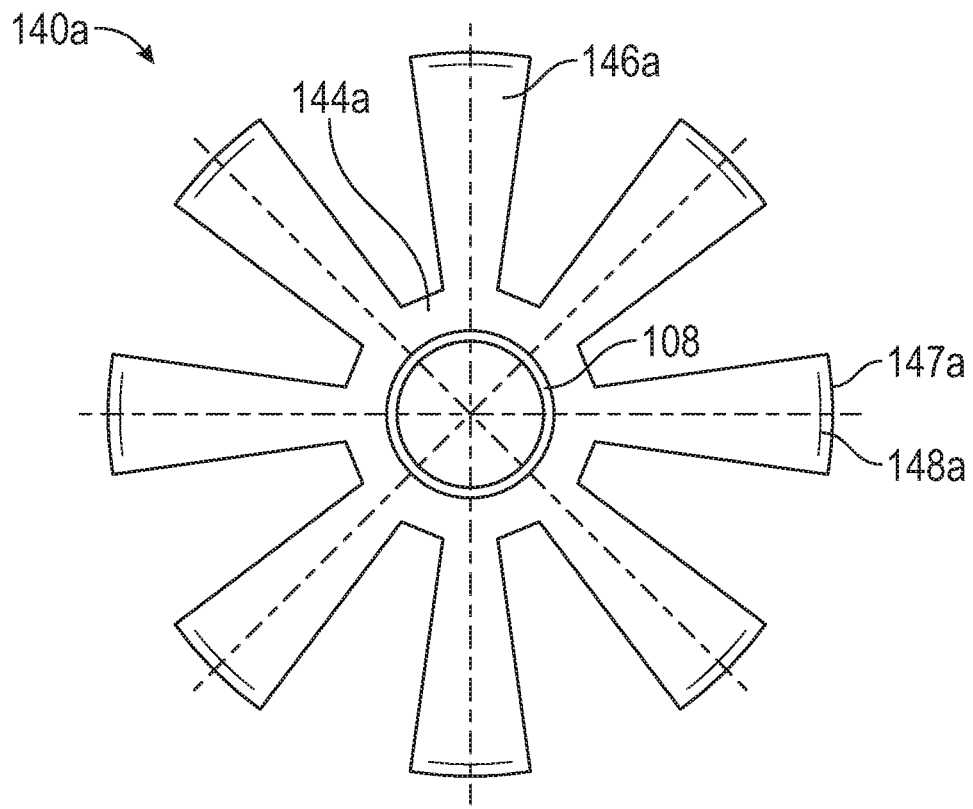
FIG. 6 is a top view of a rotor assembly of the kinetic energy storage system of FIG. 1, according to an embodiment of the present disclosure.
Figure 7:
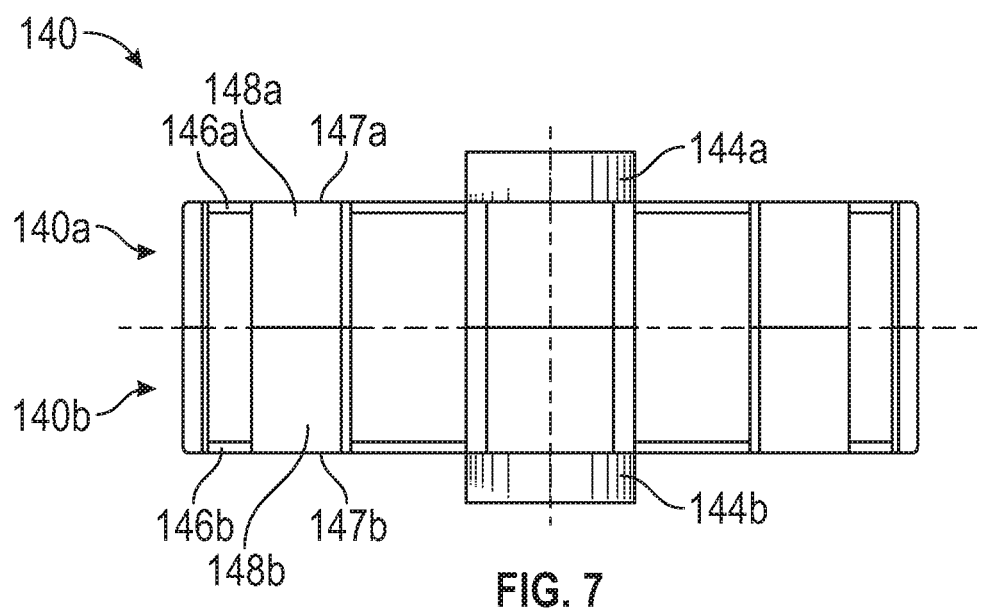
FIG. 7 is a side view of a rotor assembly of the kinetic energy storage system of FIG. 1, according to an embodiment of the present disclosure.

Referring now to FIGS. 1, 6, and 7. The rotor assembly 140 may be composed of an upper rotor cup 140*a* and a lower rotor cup 140*b*. The upper rotor cup 140*a* and the lower rotor cup 140*b* may each be in the shape of a multi-ray star, as seen by the upper rotor cup 140*a* in FIG. 6. The upper rotor cup 140*a* includes an upper central body 144*a* operably connected to the stationary bushing 108. The upper central body 144*a* of the upper rotor cup 140*a* may be operably connected to the stationary bushing 108 through the upper bearing 152, thus allowing the upper rotor cup 140*a* to rotate around the stationary bushing 108. One or more upper rotor arms 146*a* project radially outward from the upper central body 144*a*. An upper rotor pole 148*a* is located at a distal end 147*a* of each upper rotor arm 146. The lower rotor cup 140*b* includes a lower central body 144*b* operably connected to the stationary bushing 108. The lower central body 144*b* of the lower rotor cup 140*b* may be operably connected to the stationary bushing 108 through the lower bearing 154, thus allowing the lower rotor cup 140*b* to rotate around the stationary bushing 108. The upper rotor cup 140*a* and the lower rotor cup 140*b* may be assembled to enclose the stator assembly 111 within the rotor assembly 140. As seen in FIGS. 1 and 7, each upper rotor pole 148*a* may be aligned with a lower rotor pole 148*b*. As also seen in FIGS. 1 and 7, each upper rotor pole 148*a* may be operably connected to a lower rotor pole 148*b*. One or more lower rotor arms 146*b* project radially outward from the lower central body 144*b*. A lower rotor pole 148*b* is located at a distal end 147*b* of each lower rotor arm 146*b*.

Figure 8:
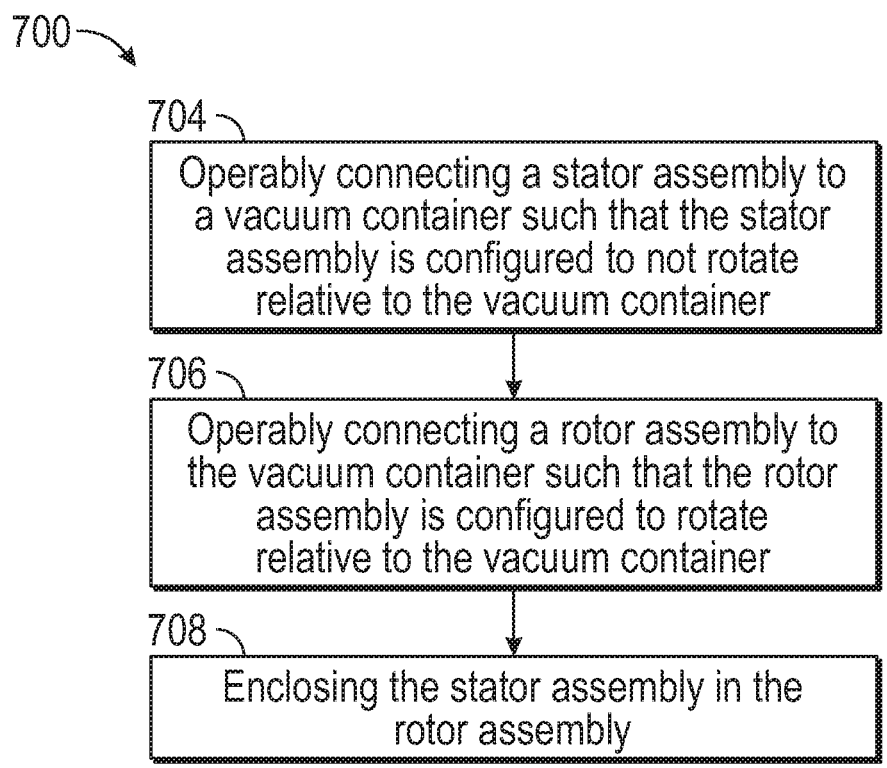
FIG. 8 is a flow process illustrating a method of assembling a kinetic energy, according to an embodiment of the present disclosure.

Referring now to FIG. 8, with continued reference to FIGS. 1-7. FIG. 8 shows a flow process illustrating a method 700 assembling a kinetic energy storage system 100, according to an embodiment of the present disclosure. At block 704, a stator assembly 111 is operably connected to a vacuum container 104 such that the stator assembly 111 is configured to not rotate relative to the vacuum container 104. As seen in FIG. 1, the vacuum container 104 encloses a vacuum chamber 106 and the stator assembly 111 is located within the vacuum chamber 106. At block 706, a rotor assembly 140 is operably connected to the vacuum container 104 such that the rotor assembly 140 is configured to rotate relative to the vacuum container 104. The rotor assembly 140 is configured to rotate relative to the vacuum container 104. At block 708, the stator assembly 111 is enclosed in the rotor assembly 140. The stator assembly 111 may be enclosed in the rotor assembly 140 by operably connecting an upper rotor cup 140*a* of the rotor assembly 140 to a lower rotor cup 140*b* of the rotor assembly 140*a*, such that the stator assembly 111 is located within the rotor assembly 140.

The method 700 may further comprise prior to block 704: operably attaching one or more stator pole cores 114 to a stator core 112 of the stator assembly 111. As mentioned above, each of the one or more stator pole cores 114 are located proximate a distal end 112*c* of the stator core 112. The method 700 may also comprise prior to block 704: operably attaching one or more upper stator pole cores 114*a* to an upper side 112 of a stator core 112 of the stator assembly 112; and operably attaching one or more lower stator pole cores 114*b* to a lower side 112*b* of the stator core 112 of the stator assembly 112. As mentioned above, each of the one or more upper stator pole cores 114*a* are located proximate a distal end 112*c* of the stator core 112. As mentioned above, each of the one or more lower stator pole cores 114*b* are located proximate a distal end 112*c* of the stator core 112. The method 700 may also comprise: wrapping an upper stator coil 118*a* around an upper inset area 115*a*; and wrapping a lower stator coil 118*b* around a lower inset area 115*b*.

While the above description has described the flow process of FIG. 8 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A kinetic energy storage system comprising:
   a vacuum container enclosing a vacuum chamber; and
   a flywheel located within the vacuum chamber, the flywheel being configured to convert electrical energy into kinetic energy, wherein the flywheel comprises: a rotor assembly and a stator assembly located within the rotor assembly,
   wherein the stator assembly further comprises:
      a stator core; and
         one or more stator pole cores, each of the one or more stator pole cores being located proximate a distal end of the stator core,
         wherein the one or more stator pole cores are configured to produce a magnetic flux in an upward direction, a downward direction, and a radially outward direction, and
         wherein the kinetic energy storage system is configured to operate as a switched reluctance machine without the need for permanent magnets, and
   wherein the rotor assembly has a multi-ray star shape, the rotor assembly further comprising:
      an upper rotor cup comprising:
         an upper central body:
         upper rotor arms projecting radially outward from the upper central body to a distal end to form the multi-ray star shape; and upper rotor poles, wherein each of the upper rotor poles is located at the distal end of each of the upper rotor arms, the upper rotor poles being oriented perpendicular to the upper rotor arms, such that the upper rotor cup is cup shaped, wherein the upper rotor poles extend and maintain the multi-ray star shape perpendicularly from the upper rotor arms, and wherein each of the upper rotor poles are circumferentially separated from each other due to the multi-ray star shape; and a lower rotor cup comprising:
a lower central body:
lower rotor arms projecting radially outward from the lower central body to a distal end to form the multi-ray star shape; and
lower rotor poles, wherein each of the lower rotor poles is located at the distal end of each of the lower rotor arms, the lower rotor poles being oriented perpendicular to the lower rotor arms, such that the lower rotor cup is cup shaped, wherein the lower rotor poles extend and maintain the multi-ray star shape perpendicularly from the lower rotor arms, and wherein each of the lower rotor poles are circumferentially separated from each other due to the multi-ray star shape,
wherein electromagnetic torque is produced by the multi-ray star shape formed by the upper rotor arm and the multi-ray star shape formed by the lower rotor arms, the electromagnetic torque is produced in response to the magnetic flux,
wherein the upper rotor poles are aligned with the lower rotor poles, and
wherein the upper rotor poles are connected to the lower rotor poles to enclose the stator assembly within the multi-ray star shape of the rotor assembly.

2. The kinetic energy storage system of claim 1, wherein: the rotor assembly is configured to rotate relative to the vacuum chamber.

3. The kinetic energy storage system of claim 1, wherein: the stator assembly is configured to remain stationary relative to the vacuum container.

4. The kinetic energy storage system of claim 1, wherein: the stator core is disc-shaped and the one or more stator pole cores are about equally spaced around the distal end of the stator core.

5. The kinetic energy storage system of claim 1 wherein each of the one or more stator pole cores further comprises:
an upper stator pole operably connected to an upper side of the stator core; and
a lower stator pole operably connected to a lower side of the stator core.

6. The kinetic energy storage system of claim 5, wherein the upper stator pole further comprises:
an upper stator pole face, wherein an upper inset area is interposed between the upper stator pole face and the upper side of the stator core, the upper inset area having a diameter less than a diameter of the upper stator pole face.

7. The kinetic energy storage system of claim 6, wherein the upper stator pole further comprises:
an upper stator coil wrapped around the upper inset area, wherein electrical power is provided to the upper stator coil through an electrical lead line.

8. The kinetic energy storage system of claim 5, wherein the lower stator pole further comprises:
a lower stator pole face, wherein a lower inset area is interposed between the lower stator pole face and the lower side of the stator core, the lower inset area having a diameter less than a diameter of the lower stator pole face.

9. The kinetic energy storage system of claim 8, wherein the lower stator pole further comprises:
a lower stator coil wrapped around the lower inset area, wherein electrical power is provided to the lower stator coil through an electrical lead line.

10. The kinetic energy storage system of claim 1, wherein the rotor assembly further comprises:
the rotor assembly is cylindrically shaped and includes one or more rotor pole cores, each of the one or more stator pole cores being located on a cylindrical surface proximate a distal end of the rotor assembly.

11. The kinetic energy storage system of claim 10, wherein:
the one or more rotor pole cores are about equally spaced around the cylindrical surface of the rotor assembly.

12. The kinetic energy storage system of claim 1, wherein: the vacuum container is cylindrical in shape.

13. The kinetic energy storage system of claim 1, wherein the vacuum container further comprises:
a first face;
a second face opposite the first face, wherein a central axis extends from the first face to the second face; and
a stationary bushing located along the central axis, the stationary bushing extending from the first face to the second face, wherein the rotor assembly is operably connected to the stationary bushing and the rotor assembly is configured to rotate around the stationary bushing.

* * * * *